United States Patent
Masuda et al.

(10) Patent No.: US 8,787,740 B2
(45) Date of Patent: Jul. 22, 2014

(54) SUPERHEATED-STEAM HEATING NOZZLE

(75) Inventors: Fumiharu Masuda, Saitama (JP); Shuuichi Sanda, Saitama (JP); Takeshi Hayano, Saitama (JP); Tadashi Yamamoto, Osaka (JP); Masanori Arakawa, Osaka (JP)

(73) Assignee: Masdac Co., Ltd., Tokorozawa-shi, Saitama (JP)

( * ) Notice: Subject to any disclaimer, the term of this patent is extended or adjusted under 35 U.S.C. 154(b) by 121 days.

(21) Appl. No.: 13/634,459

(22) PCT Filed: Dec. 24, 2010

(86) PCT No.: PCT/JP2010/073394
§ 371 (c)(1),
(2), (4) Date: Nov. 26, 2012

(87) PCT Pub. No.: WO2011/114599
PCT Pub. Date: Sep. 22, 2011

(65) Prior Publication Data
US 2013/0202276 A1    Aug. 8, 2013

(30) Foreign Application Priority Data

Mar. 16, 2010    (JP) .................................. 2010-059735

(51) Int. Cl.
*F22B 29/06*    (2006.01)
*F24H 1/10*    (2006.01)

(52) U.S. Cl.
USPC ............ 392/398; 392/386; 392/465; 392/478

(58) Field of Classification Search
None
See application file for complete search history.

(56) References Cited

FOREIGN PATENT DOCUMENTS

| JP | S43-17741 | 7/1968 |
|----|-----------|--------|
| JP | 2003-004300 | 1/2003 |
| JP | 2003-52538 | 2/2003 |
| JP | 2004-69256 | 3/2004 |
| WO | 2009/47952 | 4/2009 |

*Primary Examiner* — Thor Campbell
(74) *Attorney, Agent, or Firm* — Greer, Burns & Crain, Ltd.

(57) ABSTRACT

A superheated-steam heating nozzle is provided that includes: first-fourth steam pipes concentrically disposed from inside to outside; an outlet connection is provided to the outlet side of the superheated-steam heating nozzle and receives steam from the first steam pipe; a blow-out nozzle is connected to the outlet connection; multiple electric heaters disposed in the gap between the second steam pipe and the third steam pipe and whose sealed sections at the tips traverse a temperature-rise-prevention section and protrude towards the superheated-steam heating nozzle; a first loop-back section on the outlet side connects the gap between the third steam pipe and the fourth steam pipe with the gap between the first steam pipe and the second steam pipe; and a second loop-back section on the inlet side connects the gap between the first steam pipe and the second steam pipe with the inside of the first steam pipe.

3 Claims, 3 Drawing Sheets

<Inlet side>    <Outlet side>

<Inlet side>                <Outlet side>

SUPERHEATED-STEAM HEATING NOZZLE

TECHNICAL FIELD

The present invention relates to a superheated-steam heating nozzle, and more particularly relates to a superheated-steam heating nozzle that dissipates little heat, conserves energy, and requires little space.

BACKGROUND ART

Superheated steam is steam obtained by further heating steam (saturated vapor) at 100° C. at atmospheric pressure. Superheated steam has unique advantages when used for such purposes as heating, burning, roasting, carbonization, or sterilization, causing, manufacturers in various fields, including foods, health care, and environment-related apparatuses, to pay attention to it. If superheated steam contacts an object whose temperature is 100° C. or lower, it condenses into water and generates a great deal of heat that is transferred to the object. Also, superheated steam can dry and burn objects if its temperature is over 100° C., because it is in a gaseous state if its temperature is over 100° C. Moreover, superheated steam has high heat capacity per unit volume compared to high-temperature air or exhaust gas, so a small amount of superheated steam can dry or burn an object in a short time.

A superheated-steam oven cooks foodstuffs by directly blowing steam at 100° C. or higher to the foodstuffs. The steam contacts and surrounds the foodstuffs that are to be cooked, so as to reduce the time needed to heat them. In the conventional art, as disclosed in Japanese Unexamined Patent Application No. 2003-262338, a superheated-steam spray nozzle and a superheated-steam generator are installed separately, and the superheated-steam generator is connected to the spray nozzle by a pipe so as to send superheated steam through the pipe from the generator to the nozzle.

Patent document 1: Japanese Unexamined Patent Application No. 2003-262338

SUMMARY OF THE INVENTION

Technical Problems to be Solved

Because the superheated steam has a large amount of heat, much heat can be lost while the superheated steam passes through the pipe. In order to compensate for such a lowering of the temperature, it is necessary to keep the temperature of the superheated steam very high, which requires that the superheated-steam generator be large, so that the installation site for a superheated steam oven must be large, which limits the number of possible installation sites. Accordingly, a superheated-steam generator that is small and that can easily be mounted to an industrial oven has been desired.

Solution to the Problems

The objective of the present invention is to provide a superheated-steam heating nozzle that dissipates little heat, minimizes both the amount of energy needed for its use and the space that it requires, thereby solving the above problems of conventional art. The superheated-steam heating nozzle of the present invention is configured such that saturated vapor at 100° C. taken from a steam-intake tube provided at the inlet side of the nozzle is heated and then sprayed from a blow-out nozzle provided at the outlet side of the nozzle, and comprises a first steam pipe, a second steam pipe, a third steam pipe, and a fourth steam pipe that are disposed concentrically from inside to outside; a temperature-rise-prevention section that peripherally expands steam from a steam-intake tube to the center of the inlet side of said superheated-steam heating nozzle, sending said steam to the gap between the third steam pipe and the fourth steam pipe; an outlet connection that is provided to the outlet side of said superheated-steam heating nozzle and that receives steam from the first steam pipe; a blow-out nozzle that is connected to the outlet connection; multiple electric heaters that are disposed in the gap between the second steam pipe and the third steam pipe and whose sealed tips traverse the afore-mentioned temperature-rise-prevention section and protrude towards the outside; a first loop-back section that is provided on the outlet side of said superheated-steam heating nozzle and that connects the gap between the third steam pipe and the fourth steam pipe with the gap between the first steam pipe and the second steam pipe; and a second loop-back section on the inlet side of said superheated-steam heating nozzle and that connects the gap between the first steam pipe and the second steam pipe with the inside of the first steam pipe.

Also, a superheated-steam-temperature sensor is provided at the outlet connection.

The blow-out nozzle is constituted by a series of connected pipes (hereinafter "connected pipes") that have multiple steam-exhaust holes, and two inlets of the connected pipes are connected to two outlets provided at the outlet connection.

Advantageous Effects of the Invention

The superheated-steam heating nozzle of the present invention can reduce heat loss due to heat dissipation caused by moving the steam, because a superheated-steam heater is integrally incorporated into the nozzle. The present invention is a space-conserving, compact, superheated-steam heating nozzle because the nozzle is structured such that multiple steam pipes are disposed in concentric circles, and electric heaters are incorporated in the gap between the second steam pipe and the third steam pipe, whereby the steam is heated between those steam pipes. The nozzle of the present invention redirects steam to its central part from its periphery after the steam is turned back at its loop-back section, as a result of which the high-temperature superheated steam in the innermost pipe is in effect surrounded by the redirected steam, thereby realizing a heat-loss-preventing, energy-conserving, superheated-steam heating nozzle. The temperature-rise-prevention section is structured such that the steam supplied to the center of the inlet side spreads peripherally, so that the sides of said superheated-steam heating nozzle can be thermally insulated. Also, the sealed sections at the tip of the electric heaters are structured such that they traverse the temperature-rise-prevention section, and protrude towards the outside, so that the temperature of the sealed section is prevented from being higher than the temperature of the steam before being superheated, resulting in reduced failures of the sealed section.

Because a superheated-steam-temperature sensor is provided at the outlet connection, the electric current to be transmitted to the electric heaters can be controlled so that the superheated steam is kept at a specified temperature. Therefore, precise temperature control is realized, and unnecessary heating of the steam is avoided, which provides an energy-conserving superheated-steam heating nozzle.

Because the steam is sprayed from multiple exhaust holes of connected pipes instead of from the end opening of an open-end-type blow-out nozzle, the spraying pressure can be kept constant, and the temperature inside the oven can be maintained at a specified level.

BRIEF DESCRIPTIONS OF THE DRAWINGS

DESCRIPTION OF THE PREFERRED EMBODIMENTS

The superheated-steam heating nozzle of the present invention will now be explained in detail with reference to the drawings.

EXAMPLE

Figure 1:
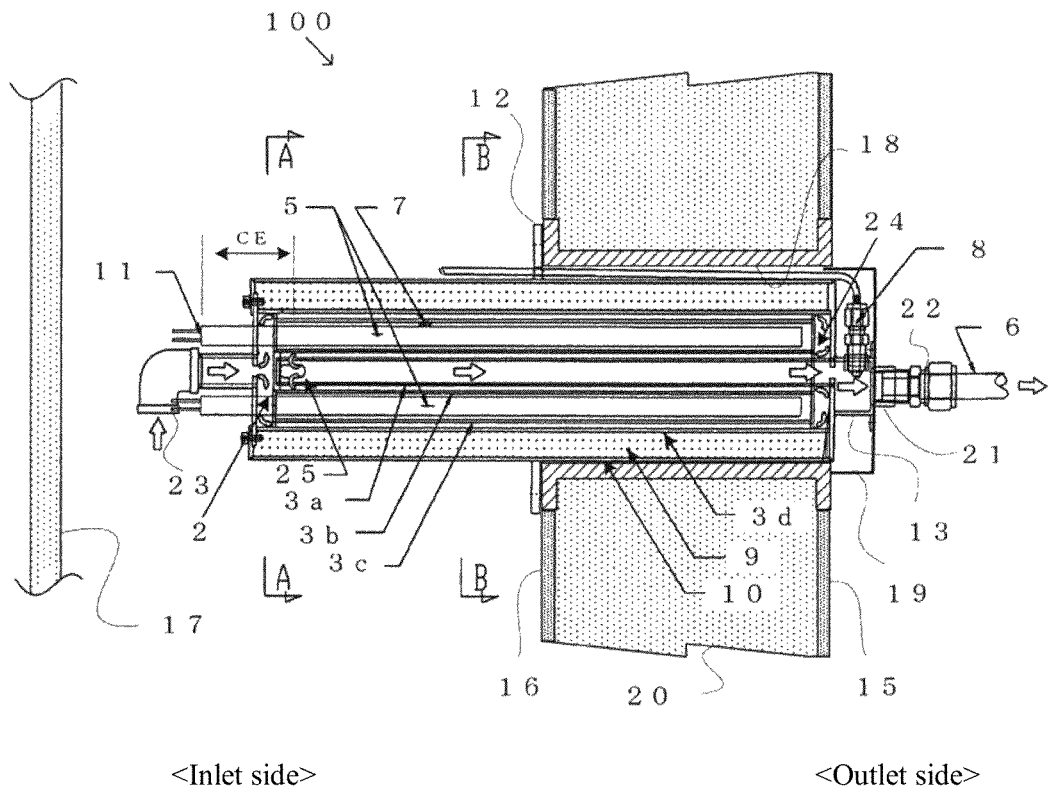
FIG. 1 is a longitudinal cross-sectional view of the superheated-steam heating nozzle according to the present invention.

FIG. 1 is a longitudinal cross-sectional view of the superheated-steam heating nozzle 100 of the present invention. As shown in FIG. 1, the superheated-steam heating nozzle 100 comprises a first steam pipe 3a, a second steam pipe 3b, a third steam pipe 3c, and a fourth steam pipe 3d that are concentrically disposed from inside to outside. The temperature-rise-prevention section 2 peripherally spreads the steam from the steam-intake tube 23 to the center of the inlet side of said superheated-steam heating nozzle 100, and sends the steam to the gap between the third steam pipe 3c and the fourth steam pipe 3d. Because the temperature of the steam allows the heat-up prevention section to maintain the temperature of the inlet side of said superheated-steam heating nozzle 100, the temperature inside the nozzle can be maintained at a specified level, i.e., heat loss is prevented. An outlet connection 13 is provided at the outlet side of said superheated-steam heating nozzle 100 to receive the steam from the first steam pipe 3a. The blow-out nozzle 6 is connected to the outlet connection 13.

As shown in FIG. 1, multiple electric heaters 5 are provided in the gap between the second steam pipe 3b and the third steam pipe 3c, and the sealed sections 11 of the electric heaters 5 are provided apart from the body of the nozzle so that the distance of CE shown in FIG. 1 is maintained. Moreover, the electric heaters 5 are formed such that the sealed sections 11 traverse the temperature-rise-prevention section 2 and protrude towards the outside. This prevents the temperature of the sealed sections 11 from being higher than the temperature of the steam before it is superheated. The first loop-back section 24, which is provided at said outlet side, connects the gap between the third steam pipe 3c and the fourth steam pipe 3d with the gap between the first steam pipe 3a and the second steam pipe 3b. The second loop-back section 25, which is provided at said inlet side, connects the gap between the first steam pipe 3c and the second steam pipe 3b with the inside of the first steam pipe.

A superheated-steam-temperature sensor 8, which is provided at the outlet connection 13, monitors the temperature of the superheated steam, and controls the electric current to be passed to the electric heaters 5, so that superheated steam can be generated at a specified temperature. Insulating material 9 is wound around the outside of the fourth steam pipe 3d, and the outside of said insulating material 9 is covered by a casing 10. Each of the electric heaters 5 has an internal thermocouple that serves as a temperature sensor, and the electric heaters 5 are tube-shaped so that they can heat the surrounding area at a uniform temperature. The superheated-steam heating nozzle 100 is entirely made of stainless steel so as to be rust-proof. Also, the entire circumferences of the joined portions of the parts through which the steam passes are welded so as to prevent water from leaking out.

As shown in FIG. 1, the superheated-steam heating nozzle 100 is attached to an oven in such a way that said nozzle 100 is inserted into a cylindrical opening 18 provided in a heat-insulating layer 20 between the oven's inner wall 15 and outer wall 16, and a flange 12 is screwed to the outer wall 16. Outside the heat-insulating layer 20 is the inside of the oven. If said nozzle 100 is inserted into the heat-insulating layer 20, the blow-out nozzle 6 at the tip of said nozzle 100 protrudes into the inside of the oven from the inner wall 15 of the oven. A masking shield 19 is provided on the inner wall 15 so as to cover the outlet connection 13 that is exposed inside the oven.

The cylindrical opening 18 has a diameter of 130 mm The heat-insulating layer 20 has a thickness of 200 mm A cylindrical oven cover 17 is provided outside of the outer wall 16 of the oven at a distance of 320 mm from said outer wall. Accordingly, the superheated-steam heating nozzle 100 can be accommodated within a space that is 520 mm (=320 mm+200 mm) long.

The superheated-steam heating nozzle 100 has a heated portion whose length is 400 mm The diameter of the casing 10 is about 115 mm The electric heater 5 is a 3-phase 200-volt type, which makes it possible to use 0.35 kW-1.00 kW per line. Six electric heaters 5 are disposed circumferentially with the same amount of space between them. The number of electric heaters used can be reduced to three or increased to nine. The steam-intake tube 23 has a steam flow of 0 Kg/h-45 Kg/h. The superheated steam of the blow-out nozzle 6 has a temperature of 100° C.-400° C. However, the above dimensions and ratings are for illustrative purposes only, and the present invention is not limited to them.

Figure 2:
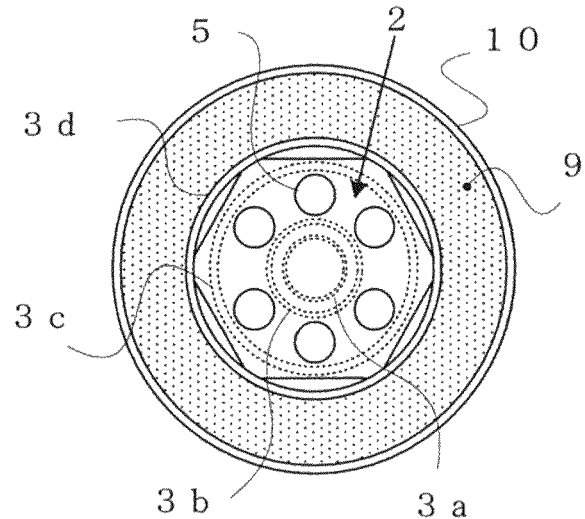
FIG. 2 is a cross-sectional view of A-A of the superheated-steam heating nozzle of FIG. 1.

FIG. 2 is a cross-sectional view through A-A of FIG. 1. A-A shows a cross-section of the temperature-rise-prevention section 2. The first steam pipe 3a, the second steam pipe 3b, and the third steam pipe 3c are shown by broken lines because they are disposed behind the base plate of the temperature-rise-prevention section 2. The steam is supplied to the center of the nozzle, spreads peripherally, and is directed into the gap between the third steam pipe 3c and the fourth steam pipe 3d. In the temperature-rise-prevention section 2, the sealed sections 11 of the electric heaters 5 transverse the temperature-rise-prevention section 2 and protrude toward the outside of the inlet side. Because saturated vapor at about 100° C. flows into the temperature-rise-prevention section 2 from the steam-intake tube 23, the sealed sections 11 of the electric heaters 5 are surrounded by the saturated vapor at about 100° C., whereby the saturated vapor at about 100° C. prevents the temperature of the sealed section 11 from increasing.

Figure 3:
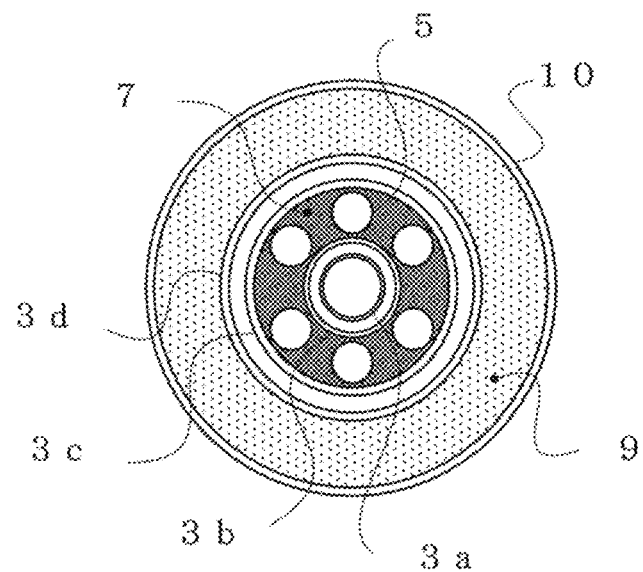
FIG. 3 is a cross-sectional view of B-B of the superheated-steam heating nozzle of FIG. 1.

FIG. 3 is a cross-sectional view through B-B of FIG. 1. B-B shows a cross-section of the heated portion of the superheated-steam heating nozzle 100. The steam pipe 3 through which the steam is passed comprises the first steam pipe 3a, the second steam pipe 3b, the third steam pipe 3c, and the fourth steam pipe 3d. Insulating material 9 is provided to the outside of the fourth steam pipe 3d, and the casing 10 is provided outside of the insulating material 9. The electric heaters 5 are provided in the gap between the second steam pipe 3b and the third steam pipe 3c. The heat conductor 7 is formed of a metallic filler having high thermal conductivity. The heat conductor 7 efficiently conducts heat from the electric heaters 5 to the second steam pipe 3b and the third steam pipe 3c, and stably holds the electric heaters 5.

Figure 4:
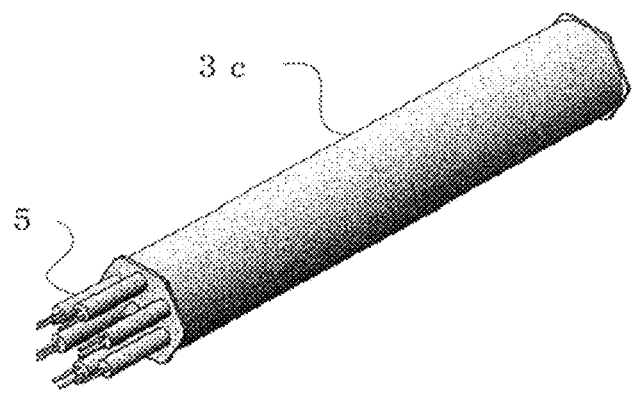
FIG. 4 is a perspective view of the third steam pipe into which an electric heater is incorporated.
Figure 5:
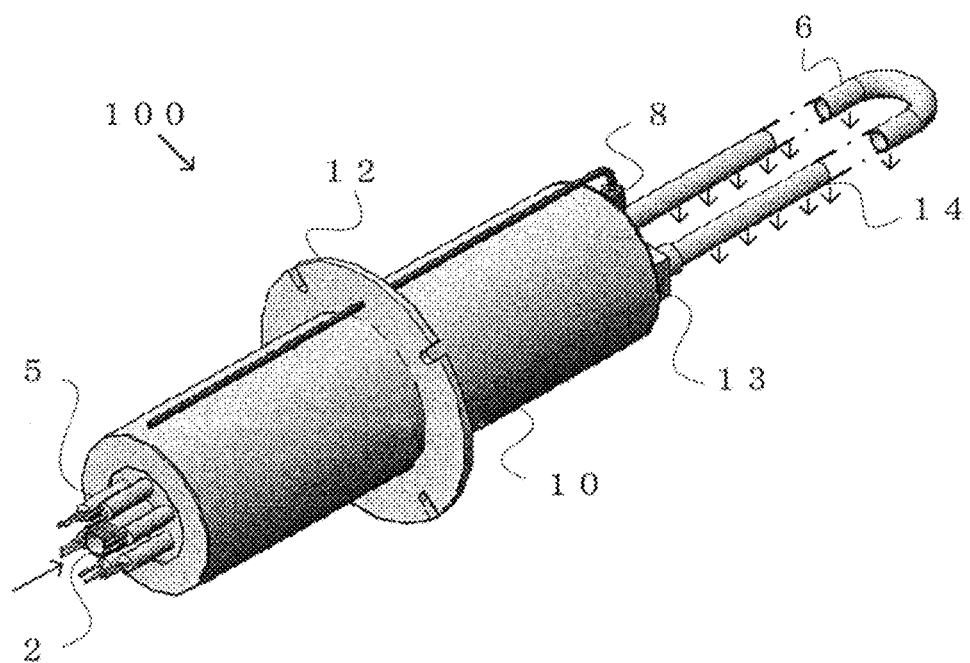
FIG. 5 is a perspective view of the superheated-steam heating nozzle of FIG. 1 seen from the steam-intake tube side.
Figure 6:
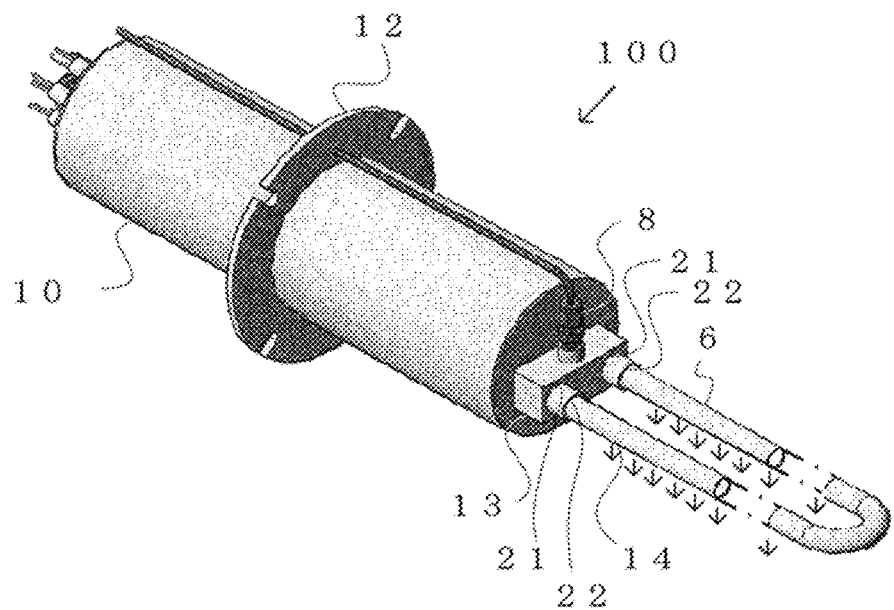
FIG. 6 is a perspective view of the superheated-steam heating nozzle of FIG. 1 seen from the blow-out nozzle side.

FIG. 4 is a perspective view of the third steam pipe 3c, into which the electric heaters 5 are incorporated. FIG. 5 is a perspective view of the superheated-steam heating nozzle 100 seen from the side of the steam-intake tube 23. FIG. 6 is a perspective view of the superheated-steam heating nozzle 100 seen from the side of the blow-out nozzle 6. As shown in FIG. 6, the outlet connection 13 is provided at the outlet side of the superheated-steam heating nozzle 100, and the two outlets 21 are provided to the outlet connection 13. The blow-out nozzle 6 is provided with multiple exhaust holes 14 that face downward and from which the steam is sprayed. The blow-out nozzle 6 is composed of connected pipes, and the inlets 22 that are provided at both ends of the blow-out nozzle 6 are connected to the two outlets 21. The steam is supplied from the two outlets 21.

As shown in FIGS. 1-4, the steam that is fed to the steam-intake tube 23 enters into the gap between the third steam pipe 3c and the fourth steam pipe 3d from the temperature-rise-prevention section 2, whereby the steam moves from the inlet side to the outlet side. While the steam is moving it is heated by contacting the outside of the third steam pipe that is heated by the electric heaters 5. Here the steam is turned back and returns to the inlet side while moving through the gap between the first steam pipe 3a and the second steam pipe 3b. While returning to the inlet side, the steam is heated by contacting the inside of the second steam pipe 3b that is heated by the electric heaters 5. The steam is then turned back again and moves inside the first steam pipe 3a so that the steam enters into the outlet connection 13. The steam is then sprayed from the exhaust holes of the blow-out nozzle 6.

Because the steam is sprayed from multiple exhaust holes of the connected pipes instead of from the end opening of an open-end-type blow-out nozzle, the spray pressure does not vary much in an oven as it would if an open-end-type blow-out nozzle were used. Because the nozzle of the present invention can spray the steam at a fixed pressure into an oven, the temperature inside the oven can be maintained at a specified level. The superheated-steam heating nozzle 100 has a structure such that the first steam pipe 3a through the fourth steam pipe 3d are disposed concentrically from inside to outside. The steam goes back and forth between the inlet side and the outlet side three times. This embodiment can be modified in such a way that steam pipes are further added to the outside of the fourth steam pipe 3d so that the steam goes back and forth five times or seven times.

INDUSTRIAL APPLICABILITY

The present invention realizes an energy-conserving and space-conserving superheated-steam heating nozzle that minimizes heat dissipation because electric heaters are incorporated into the nozzle.

LIST OF NUMBERS USED

2 temperature-rise-prevention section steam pipe
3a first steam pipe
3b second steam pipe
3c third steam pipe
3d fourth steam pipe
5 electric heater
6 blow-out nozzle
7 heat conductor
8 superheated-steam-temperature sensor
9 insulating material
10 casing
11 sealed section of heater
12 flange
13 outlet connection
14 exhaust hole
15 inside wall of oven
16 outside wall of oven
17 oven cover
18 cylindrical opening
19 masking shield
20 heat-insulating layer
21 outlet
22 inlet
23 steam-intake tube
24 first loop-back section
25 second loop-back section
100 superheated-steam heating nozzle

The invention claimed is:

1. A superheated-steam heating nozzle in which saturated vapor at 100° C. taken from a steam-intake tube provided at the inlet side of the nozzle is heated and then sprayed from a blow-out nozzle provided at the outlet side of said superheated-steam heating nozzle, with said superheated-steam heating nozzle comprising:

a first steam pipe, a second steam pipe, a third steam pipe, and a fourth steam pipe that are concentrically disposed from inside to outside;

a temperature-rise-prevention section that peripherally spreads steam from a steam-intake tube to the center of said inlet side, sending said steam to the gap between the third steam pipe and the fourth steam pipe;

an outlet connection that is provided to said outlet side and that receives steam from the first steam pipe;

a blow-out nozzle that is connected to the outlet connection;

multiple electric heaters that are disposed in the gap between the second steam pipe and the third steam pipe and whose sealed sections at the tips traverse the aforementioned temperature-rise-prevention section and protrude toward the outside of said superheated-steam heating nozzle;

a first loop-back section that is provided on said outlet side and that connects the gap between the third steam pipe and the fourth steam pipe with the gap between the first steam pipe and the second steam pipe; and a second loop-back section that is provided on said inlet side and that connects the gap between the first steam pipe and the second steam pipe with the inside of the first steam pipe.

2. The superheated-steam heating nozzle of claim 1, and wherein a superheated-steam-temperature sensor is provided at said outlet connection.

3. The superheated-steam heating nozzle of claim 1, and wherein said blow-out nozzle is constituted by connected pipes that include multiple steam-exhaust holes, with the two inlets of the connected pipe connected to two outlets provided at said outlet connection.

* * * * *